United States Patent
Taylor et al.

(10) Patent No.: US 9,864,988 B2
(45) Date of Patent: Jan. 9, 2018

(54) PAYMENT PROCESSING FOR QUALIFIED TRANSACTION ITEMS

(71) Applicant: Visa International Service Association, San Francisco, CA (US)

(72) Inventors: Mary Theresa Taylor, San Francisco, CA (US); Karen Louise Cervenka, Belmont, CA (US); Marla Bischoff, Menlo Park, CA (US); Justin Chace, Redwood City, CA (US)

(73) Assignee: Visa International Service Association, San Francisco, CA (US)

( * ) Notice: Subject to any disclaimer, the term of this patent is extended or adjusted under 35 U.S.C. 154(b) by 6 days.

(21) Appl. No.: 13/915,867

(22) Filed: Jun. 12, 2013

(65) Prior Publication Data

US 2013/0339167 A1     Dec. 19, 2013

Related U.S. Application Data

(60) Provisional application No. 61/660,341, filed on Jun. 15, 2012.

(51) Int. Cl.
G06Q 20/38     (2012.01)
G06Q 20/20     (2012.01)

(52) U.S. Cl.
CPC ........... *G06Q 20/382* (2013.01); *G06Q 20/20* (2013.01); *G06Q 20/387* (2013.01)

(58) Field of Classification Search
CPC .... G06Q 20/10; G06Q 10/10; G06Q 20/0855; G06Q 30/0255; G06Q 20/204; G06Q 20/12

(Continued)

(56) References Cited

U.S. PATENT DOCUMENTS

| 4,941,090 A | 7/1990 | McCarthy |
| 5,025,372 A | 6/1991 | Burton et al. |

(Continued)

FOREIGN PATENT DOCUMENTS

| CN | 1584894 | 2/2005 |
| JP | 2003502763 | 1/2003 |

(Continued)

OTHER PUBLICATIONS

International Patent Application PCT/US2010/024057, International Search Report & Written Opinion, dated Sep. 28, 2010.

(Continued)

*Primary Examiner* — Vanel Frenel
(74) *Attorney, Agent, or Firm* — The Webb Law Firm

(57) ABSTRACT

Systems, methods, and apparatuses for providing a portable consumer device (e.g., a plastic card) that includes a coupon code and an account number (e.g., embedded on a magnetic stripe or a chip) where the portable consumer device is configured to apply a coupon to goods and services purchased at a merchant (e.g., store). Upon identifying the goods and services under a particular category specified by the coupon code (e.g., healthy food category), a user may pay for a predetermined portion (e.g., 50%) of the goods and services under the particular category using the portable consumer device. The user may pay for the remaining portion using a benefits card (e.g., state benefits card). As such, by allowing the user to pay for the predetermined portion using the portable consumer device, the user has incentive to purchase goods and services that fall under the particular category.

14 Claims, 7 Drawing Sheets

(58) Field of Classification Search
USPC ..... 705/21, 41, 35, 39, 44, 75; 235/379, 375
See application file for complete search history.

(56) References Cited

U.S. PATENT DOCUMENTS

| | | | |
|---|---|---|---|
| 5,117,355 A | | 5/1992 | McCarthy |
| 5,202,826 A | | 4/1993 | McCarthy |
| 5,287,268 A | | 2/1994 | McCarthy |
| 5,649,118 A | * | 7/1997 | Carlisle ................ G06Q 20/102 705/40 |
| 5,689,100 A | | 11/1997 | Carrithers et al. |
| 5,708,422 A | * | 1/1998 | Blonder ................ G06Q 20/40 340/5.41 |
| 5,774,870 A | | 6/1998 | Storey |
| 5,794,118 A | * | 8/1998 | Yoshinobu ................ 725/134 |
| 5,794,210 A | * | 8/1998 | Goldhaber et al. ........ 705/14.69 |
| RE36,116 E | | 2/1999 | McCarthy |
| 5,923,016 A | | 7/1999 | Fredregill et al. |
| 5,937,391 A | | 8/1999 | Ikeda et al. |
| 5,956,694 A | | 9/1999 | Powell |
| 6,032,136 A | | 2/2000 | Brake, Jr. et al. |
| 6,138,911 A | | 10/2000 | Fredregill et al. |
| 6,243,687 B1 | | 6/2001 | Powell |
| 6,251,017 B1 | | 6/2001 | Leason et al. |
| 6,332,126 B1 | | 12/2001 | Pierce et al. |
| 6,334,108 B1 | | 12/2001 | Deaton et al. |
| 6,336,099 B1 | | 1/2002 | Barnett et al. |
| 6,341,353 B1 | | 1/2002 | Herman et al. |
| 6,408,286 B1 | | 6/2002 | Heiden |
| 6,450,407 B1 | | 9/2002 | Freeman et al. |
| 6,594,640 B1 | | 7/2003 | Postrel |
| 6,606,745 B2 | | 8/2003 | Maggio |
| 6,663,105 B1 | | 12/2003 | Sullivan et al. |
| 6,721,743 B1 | | 4/2004 | Sakakibara |
| 6,741,968 B2 | | 5/2004 | Jacoves et al. |
| 6,748,365 B1 | | 6/2004 | Quinlan et al. |
| 6,820,061 B2 | | 11/2004 | Postrel |
| 6,829,586 B2 | | 12/2004 | Postrel |
| 6,842,739 B2 | | 1/2005 | Postrel |
| 6,856,820 B1 | | 2/2005 | Kolls |
| 6,865,547 B1 | | 3/2005 | Brake, Jr. et al. |
| 6,910,003 B1 | | 6/2005 | Arnold et al. |
| 6,915,271 B1 | | 7/2005 | Meyer et al. |
| 6,947,898 B2 | | 9/2005 | Postrel |
| 6,978,250 B1 | | 12/2005 | Kawan |
| 7,054,830 B1 | | 5/2006 | Eggleston |
| 7,072,864 B2 | | 7/2006 | Brake, Jr. et al. |
| 7,096,190 B2 | | 8/2006 | Postrel |
| 7,134,087 B2 | | 11/2006 | Bortolin et al. |
| 7,143,069 B2 | | 11/2006 | Lacivita et al. |
| 7,163,145 B2 | | 1/2007 | Cohagan et al. |
| 7,263,507 B1 | | 8/2007 | Brake, Jr. et al. |
| 7,370,811 B2 | | 5/2008 | Turner et al. |
| 7,376,580 B1 | | 5/2008 | Walker et al. |
| 7,398,225 B2 | | 7/2008 | Voltmer et al. |
| 7,424,617 B2 | | 9/2008 | Boyd et al. |
| 7,428,498 B2 | | 9/2008 | Voltmer et al. |
| 7,516,883 B2 | | 4/2009 | Hardesty et al. |
| 7,606,730 B2 | | 10/2009 | Antonucci |
| 7,624,041 B2 | | 11/2009 | Postrel |
| 7,665,660 B2 | | 2/2010 | Degliantoni et al. |
| 7,680,688 B2 | | 3/2010 | Hessburg et al. |
| 7,686,218 B2 | | 3/2010 | Hessburg et al. |
| 7,742,943 B2 | | 6/2010 | Postrel |
| 7,753,264 B2 | | 7/2010 | Shafer et al. |
| 7,765,124 B2 | | 7/2010 | Postrel |
| 7,769,630 B2 | | 8/2010 | Postrel |
| 7,777,053 B2 | | 8/2010 | Sanganbhatla |
| 7,828,206 B2 | | 11/2010 | Hessburg et al. |
| 7,844,490 B2 | | 11/2010 | Patterson |
| 7,853,529 B1 | | 12/2010 | Walker et al. |
| 7,868,218 B2 | | 1/2011 | Clark |
| 7,870,022 B2 | | 1/2011 | Bous et al. |
| 7,894,634 B2 | | 2/2011 | Chung |
| 7,933,800 B2 | | 4/2011 | Main et al. |
| 7,958,030 B2 | | 6/2011 | Kemper et al. |
| 8,010,405 B1 | * | 8/2011 | Bortolin et al. ............ 705/14.1 |
| 8,046,256 B2 | | 10/2011 | Chien et al. |
| 8,155,999 B2 | | 4/2012 | de Boer et al. |
| 8,180,671 B2 | | 5/2012 | Cohagan et al. |
| 8,260,788 B2 | | 9/2012 | Saito |
| 8,265,993 B2 | | 9/2012 | Chien et al. |
| 8,266,031 B2 | | 9/2012 | Norris et al. |
| 8,285,643 B2 | | 10/2012 | Isaacson et al. |
| 8,301,593 B2 | | 10/2012 | Hoffman |
| 8,302,030 B2 | | 10/2012 | Soroca |
| 8,313,023 B1 | | 11/2012 | McGhie |
| 8,315,929 B2 | | 11/2012 | Allen-Rouman et al. |
| 8,332,290 B1 | | 12/2012 | Venturo |
| 8,341,081 B1 | | 12/2012 | Wang et al. |
| 8,342,399 B1 | | 1/2013 | McGhie |
| 8,401,967 B1 | | 3/2013 | Postrel |
| 8,458,016 B1 | | 6/2013 | Medina, III et al. |
| 8,463,706 B2 | | 6/2013 | Cervenka |
| 8,478,640 B2 | | 7/2013 | Postrel |
| 8,511,550 B1 | | 8/2013 | McGhie |
| 8,523,054 B2 | | 9/2013 | Yankovich et al. |
| 8,538,812 B2 | | 9/2013 | Ramer et al. |
| 8,612,208 B2 | | 12/2013 | Cooper et al. |
| 8,630,989 B2 | | 1/2014 | Blohm et al. |
| 8,639,567 B2 | | 1/2014 | Winters |
| 8,639,571 B1 | | 1/2014 | Leason et al. |
| 8,639,629 B1 | | 1/2014 | Hoffman |
| 8,650,124 B2 | | 2/2014 | Singh |
| 8,682,715 B1 | | 3/2014 | Cedeno |
| 8,682,791 B2 | | 3/2014 | Bies et al. |
| 8,725,568 B2 | | 5/2014 | Cervenka et al. |
| 8,732,082 B2 | | 5/2014 | Karim |
| 8,880,431 B2 | | 11/2014 | Ovick et al. |
| 8,939,356 B2 | * | 1/2015 | Pourfallah ............ G06Q 20/347 235/375 |
| 8,942,992 B1 | | 1/2015 | Zhu |
| 8,965,810 B2 | | 2/2015 | Cervenka et al. |
| 9,031,859 B2 | | 5/2015 | Salmon et al. |
| 9,460,436 B2 | | 10/2016 | Ovick et al. |
| 9,495,690 B2 | | 11/2016 | Ovick et al. |
| 9,626,678 B2 | | 4/2017 | Ovick et al. |
| 2001/0034654 A1 | | 10/2001 | L. Vigil et al. |
| 2001/0054003 A1 | | 12/2001 | Chien et al. |
| 2002/0013728 A1 | | 1/2002 | Wilkman |
| 2002/0026354 A1 | * | 2/2002 | Shoji et al. ..................... 705/14 |
| 2002/0046116 A1 | | 4/2002 | Hohle et al. |
| 2002/0052860 A1 | | 5/2002 | Geshwind |
| 2002/0062249 A1 | | 5/2002 | Iannacci |
| 2002/0103753 A1 | * | 8/2002 | Schimmel ....................... 705/39 |
| 2002/0128057 A1 | | 9/2002 | Walker et al. |
| 2002/0133467 A1 | * | 9/2002 | Hobson ................ G06Q 20/02 705/64 |
| 2002/0160761 A1 | | 10/2002 | Wolfe |
| 2002/0194128 A1 | | 12/2002 | Maritzen et al. |
| 2003/0004808 A1 | * | 1/2003 | Elhaoussine ......... G06Q 20/045 705/14.27 |
| 2003/0040964 A1 | | 2/2003 | Lacek |
| 2003/0055727 A1 | | 3/2003 | Walker et al. |
| 2003/0091216 A1 | | 5/2003 | Silverbrook et al. |
| 2003/0115100 A1 | | 6/2003 | Teicher |
| 2003/0120554 A1 | | 6/2003 | Hogan et al. |
| 2003/0140004 A1 | | 7/2003 | O'Leary et al. |
| 2003/0144907 A1 | | 7/2003 | Cohen, Jr. et al. |
| 2003/0144965 A1 | | 7/2003 | Prasad et al. |
| 2003/0216967 A1 | | 11/2003 | Williams |
| 2003/0225618 A1 | | 12/2003 | Hessburg et al. |
| 2003/0225619 A1 | | 12/2003 | Dokken et al. |
| 2003/0233439 A1 | | 12/2003 | Stone et al. |
| 2003/0236704 A1 | | 12/2003 | Antonucci et al. |
| 2003/0236712 A1 | | 12/2003 | Antonucci et al. |
| 2004/0024739 A1 | | 2/2004 | Copperman et al. |
| 2004/0039693 A1 | | 2/2004 | Nauman et al. |
| 2004/0049423 A1 | | 3/2004 | Kawashima et al. |
| 2004/0083170 A1 | | 4/2004 | Bam et al. |
| 2004/0088216 A1 | | 5/2004 | Bangalore |
| 2004/0088376 A1 | | 5/2004 | McCanne et al. |
| 2004/0104760 A1 | | 6/2004 | Ando |
| 2004/0117250 A1 | | 6/2004 | Lubow et al. |

(56) References Cited

U.S. PATENT DOCUMENTS

| | | |
|---|---|---|
| 2004/0133472 A1 | 7/2004 | Leason et al. |
| 2004/0138949 A1 | 7/2004 | Darnton et al. |
| 2004/0140361 A1* | 7/2004 | Paul ................. G06Q 20/341 235/462.45 |
| 2004/0186773 A1 | 9/2004 | George et al. |
| 2004/0203648 A1 | 10/2004 | Wong |
| 2004/0238622 A1 | 12/2004 | Freiberg |
| 2004/0249710 A1 | 12/2004 | Smith et al. |
| 2004/0249753 A1 | 12/2004 | Blinn et al. |
| 2004/0260608 A1 | 12/2004 | Lewis et al. |
| 2005/0010533 A1 | 1/2005 | Cooper |
| 2005/0021399 A1 | 1/2005 | Postrel |
| 2005/0021401 A1 | 1/2005 | Postrel |
| 2005/0060225 A1 | 3/2005 | Postrel |
| 2005/0075932 A1* | 4/2005 | Mankoff ........... G06F 17/30011 705/14.35 |
| 2005/0080727 A1 | 4/2005 | Postrel |
| 2005/0091152 A1 | 4/2005 | Suisa |
| 2005/0096975 A1 | 5/2005 | Moshe |
| 2005/0114213 A1 | 5/2005 | Smith et al. |
| 2005/0119938 A1 | 6/2005 | Smith et al. |
| 2005/0149394 A1 | 7/2005 | Postrel |
| 2005/0205666 A1 | 9/2005 | Ward et al. |
| 2005/0240472 A1 | 10/2005 | Postrel |
| 2005/0240478 A1* | 10/2005 | Lubow ................ G06Q 20/342 705/14.17 |
| 2005/0251469 A1 | 11/2005 | Nandakumar |
| 2005/0267800 A1 | 12/2005 | Tietzen et al. |
| 2006/0010033 A1 | 1/2006 | Thomas |
| 2006/0020511 A1 | 1/2006 | Postrel |
| 2006/0053056 A1* | 3/2006 | Alspach-Goss et al. ....... 705/14 |
| 2006/0059040 A1 | 3/2006 | Eldred et al. |
| 2006/0111978 A1 | 5/2006 | Tietzen et al. |
| 2006/0129456 A1 | 6/2006 | Walker |
| 2006/0136299 A1 | 6/2006 | Ruhmkork |
| 2006/0161478 A1 | 7/2006 | Turner et al. |
| 2006/0181515 A1 | 8/2006 | Fletcher et al. |
| 2006/0184419 A1 | 8/2006 | Postrel |
| 2006/0190337 A1 | 8/2006 | Ayers, Jr. |
| 2006/0206376 A1 | 9/2006 | Gibbs et al. |
| 2006/0208064 A1 | 9/2006 | Mendelovich et al. |
| 2006/0208065 A1 | 9/2006 | Mendelovich et al. |
| 2006/0253321 A1 | 11/2006 | Heywood |
| 2006/0253392 A1 | 11/2006 | Davies |
| 2006/0259364 A1 | 11/2006 | Strock et al. |
| 2006/0259390 A1* | 11/2006 | Rosenberger ................... 705/35 |
| 2006/0261149 A1 | 11/2006 | Raghavendra Tulluri |
| 2006/0277103 A1 | 12/2006 | Fujita et al. |
| 2006/0278697 A1 | 12/2006 | Lovett |
| 2006/0287943 A1 | 12/2006 | Postrel |
| 2007/0005416 A1 | 1/2007 | Jackson et al. |
| 2007/0005510 A1 | 1/2007 | Bloodworth et al. |
| 2007/0011044 A1 | 1/2007 | Hansen |
| 2007/0038515 A1 | 2/2007 | Postrel |
| 2007/0043613 A1 | 2/2007 | Longest |
| 2007/0043619 A1 | 2/2007 | Leason et al. |
| 2007/0043620 A1 | 2/2007 | Leason et al. |
| 2007/0078719 A1 | 4/2007 | Schmitt et al. |
| 2007/0100691 A1 | 5/2007 | Patterson et al. |
| 2007/0105536 A1 | 5/2007 | Tingo, Jr. |
| 2007/0112629 A1 | 5/2007 | Solomon |
| 2007/0129955 A1 | 6/2007 | Dalmia et al. |
| 2007/0129998 A1 | 6/2007 | Postrel |
| 2007/0130011 A1 | 6/2007 | Postrel |
| 2007/0143178 A1 | 6/2007 | Citrin et al. |
| 2007/0168354 A1 | 7/2007 | Ramer et al. |
| 2007/0192784 A1 | 8/2007 | Postrel |
| 2007/0198338 A1 | 8/2007 | Heywood |
| 2007/0214049 A1 | 9/2007 | Postrel |
| 2007/0226059 A1 | 9/2007 | Postrel |
| 2007/0260509 A1 | 11/2007 | Hines et al. |
| 2007/0288313 A1 | 12/2007 | Brodson |
| 2007/0299742 A1* | 12/2007 | Williams ............... G06Q 20/02 705/39 |
| 2008/0010154 A1 | 1/2008 | Tietzen et al. |
| 2008/0011820 A1 | 1/2008 | Brown et al. |
| 2008/0011837 A1 | 1/2008 | Wesley |
| 2008/0021784 A1 | 1/2008 | Hessburg et al. |
| 2008/0040222 A1 | 2/2008 | Gee |
| 2008/0040270 A1 | 2/2008 | Buchheit et al. |
| 2008/0059303 A1 | 3/2008 | Fordyce, III |
| 2008/0071587 A1 | 3/2008 | Granucci et al. |
| 2008/0071640 A1 | 3/2008 | Nguyen |
| 2008/0077499 A1 | 3/2008 | Ariff et al. |
| 2008/0103968 A1 | 5/2008 | Bies et al. |
| 2008/0120221 A1 | 5/2008 | Toneguzzo |
| 2008/0133350 A1 | 6/2008 | White et al. |
| 2008/0133351 A1 | 6/2008 | White et al. |
| 2008/0147496 A1 | 6/2008 | Bal et al. |
| 2008/0147534 A1 | 6/2008 | Ephrati et al. |
| 2008/0154676 A1 | 6/2008 | Suk |
| 2008/0154702 A1 | 6/2008 | Pleban |
| 2008/0154722 A1 | 6/2008 | Galinos |
| 2008/0177627 A1 | 7/2008 | Cefail |
| 2008/0195528 A1 | 8/2008 | Keithley |
| 2008/0201224 A1 | 8/2008 | Owens et al. |
| 2008/0201226 A1 | 8/2008 | Carlson et al. |
| 2008/0210753 A1 | 9/2008 | Plozay et al. |
| 2008/0217397 A1 | 9/2008 | Degliantoni et al. |
| 2008/0221986 A1 | 9/2008 | Soicher et al. |
| 2008/0222049 A1 | 9/2008 | Loomis et al. |
| 2008/0228563 A1 | 9/2008 | Zellner et al. |
| 2008/0228583 A1 | 9/2008 | MacDonald |
| 2008/0230600 A1 | 9/2008 | Black et al. |
| 2008/0249861 A1 | 10/2008 | Carotta et al. |
| 2008/0270246 A1 | 10/2008 | Chen |
| 2008/0301001 A1 | 12/2008 | Baumgartner, IV et al. |
| 2008/0313034 A1 | 12/2008 | Wise |
| 2008/0313044 A1 | 12/2008 | Aaltonen et al. |
| 2009/0006203 A1 | 1/2009 | Fordyce, III et al. |
| 2009/0018909 A1 | 1/2009 | Grecia |
| 2009/0030793 A1 | 1/2009 | Fordyce, III |
| 2009/0048884 A1 | 2/2009 | Olives et al. |
| 2009/0048916 A1 | 2/2009 | Nuzum et al. |
| 2009/0076911 A1 | 3/2009 | Vo et al. |
| 2009/0076912 A1 | 3/2009 | Rajan et al. |
| 2009/0106112 A1 | 4/2009 | Dalmia et al. |
| 2009/0106115 A1* | 4/2009 | James ................... G06Q 20/10 705/14.26 |
| 2009/0106300 A1 | 4/2009 | Brown |
| 2009/0112721 A1 | 4/2009 | Hammad et al. |
| 2009/0150235 A1 | 6/2009 | Blythe |
| 2009/0176580 A1 | 7/2009 | Herrmann et al. |
| 2009/0198572 A1 | 8/2009 | Jurgens |
| 2009/0240627 A1 | 9/2009 | Rodriguez et al. |
| 2009/0271262 A1 | 10/2009 | Hammad |
| 2009/0292595 A1 | 11/2009 | Tonnison et al. |
| 2009/0307118 A1 | 12/2009 | Baumgartner, IV |
| 2009/0307130 A1 | 12/2009 | Tan |
| 2009/0313109 A1 | 12/2009 | Bous et al. |
| 2010/0010901 A1 | 1/2010 | Marshall et al. |
| 2010/0030688 A1 | 2/2010 | Patterson |
| 2010/0042517 A1 | 2/2010 | Paintin et al. |
| 2010/0051691 A1 | 3/2010 | Brooks et al. |
| 2010/0057551 A1 | 3/2010 | Blaisdell |
| 2010/0057553 A1 | 3/2010 | Ameiss et al. |
| 2010/0070376 A1* | 3/2010 | Proud et al. ..................... 705/21 |
| 2010/0075551 A1 | 3/2010 | Blaisdell |
| 2010/0075638 A1 | 3/2010 | Carlson |
| 2010/0076820 A1* | 3/2010 | Davis ............... 705/10 |
| 2010/0100484 A1* | 4/2010 | Nguyen et al. ................. 705/44 |
| 2010/0106598 A1 | 4/2010 | Grimes |
| 2010/0125737 A1 | 5/2010 | Kang |
| 2010/0145855 A1 | 6/2010 | Fordyce, III et al. |
| 2010/0161404 A1 | 6/2010 | Taylor et al. |
| 2010/0169215 A1 | 7/2010 | Balasubramanian et al. |
| 2010/0174596 A1 | 7/2010 | Gilman et al. |
| 2010/0211445 A1 | 8/2010 | Bodington |
| 2010/0211469 A1 | 8/2010 | Salmon |
| 2010/0223145 A1* | 9/2010 | Dragt ................. G06Q 20/20 705/17 |
| 2010/0274626 A1* | 10/2010 | Carlson ................. 705/10 |
| 2010/0274659 A1 | 10/2010 | Antonucci et al. |
| 2010/0280892 A1 | 11/2010 | Uzunalioglu et al. |

(56) References Cited

U.S. PATENT DOCUMENTS

| | | |
|---|---|---|
| 2010/0291895 A1 | 11/2010 | Drzyzga et al. |
| 2010/0299194 A1 | 11/2010 | Snyder et al. |
| 2010/0306032 A1 | 12/2010 | Jolley |
| 2010/0312626 A1 | 12/2010 | Cervenka |
| 2010/0312631 A1 | 12/2010 | Cervenka |
| 2010/0312632 A1 | 12/2010 | Cervenka |
| 2010/0312633 A1 | 12/2010 | Cervenka |
| 2010/0312634 A1 | 12/2010 | Cervenka |
| 2010/0312635 A1 | 12/2010 | Cervenka |
| 2011/0022448 A1 | 1/2011 | Strock et al. |
| 2011/0022514 A1 | 1/2011 | Lal |
| 2011/0035278 A1 | 2/2011 | Fordyce, III et al. |
| 2011/0047019 A1 | 2/2011 | Cervenka |
| 2011/0047023 A1 | 2/2011 | Lieblang et al. |
| 2011/0066483 A1 | 3/2011 | Salmon et al. |
| 2011/0082739 A1 | 4/2011 | Purfallah |
| 2011/0087530 A1* | 4/2011 | Fordyce, III .......... G06Q 10/00 705/14.17 |
| 2011/0087531 A1 | 4/2011 | Winters et al. |
| 2011/0103586 A1 | 5/2011 | Nobre |
| 2011/0125565 A1 | 5/2011 | MacIlwaine et al. |
| 2011/0145148 A1 | 6/2011 | Hammad |
| 2011/0161230 A1 | 6/2011 | Singh |
| 2011/0191417 A1 | 8/2011 | Rathod |
| 2011/0218868 A1 | 9/2011 | Young et al. |
| 2011/0231258 A1 | 9/2011 | Winters et al. |
| 2011/0238483 A1 | 9/2011 | Yoo et al. |
| 2011/0264567 A1 | 10/2011 | Clyne |
| 2011/0276493 A1 | 11/2011 | Graham, III et al. |
| 2011/0276495 A1 | 11/2011 | Varadarajan et al. |
| 2011/0288918 A1 | 11/2011 | Cervenka |
| 2011/0288924 A1 | 11/2011 | Thomas et al. |
| 2011/0295675 A1 | 12/2011 | Reodica |
| 2012/0010940 A1 | 1/2012 | Masi |
| 2012/0016728 A1 | 1/2012 | Ahmad et al. |
| 2012/0035998 A1 | 2/2012 | Chien et al. |
| 2012/0041812 A1 | 2/2012 | Postrel |
| 2012/0054000 A1 | 3/2012 | Boppert et al. |
| 2012/0101881 A1 | 4/2012 | Taylor et al. |
| 2012/0101894 A1 | 4/2012 | Sterling et al. |
| 2012/0123849 A1 | 5/2012 | Armstrong |
| 2012/0130705 A1 | 5/2012 | Sun et al. |
| 2012/0150669 A1* | 6/2012 | Langley et al. ................ 705/16 |
| 2012/0179531 A1 | 7/2012 | Kim |
| 2012/0191525 A1 | 7/2012 | Singh |
| 2012/0215610 A1 | 8/2012 | Amaro et al. |
| 2012/0215614 A1 | 8/2012 | Hochstatter et al. |
| 2012/0215624 A1 | 8/2012 | Ramer et al. |
| 2012/0215638 A1 | 8/2012 | Bennett et al. |
| 2012/0221446 A1 | 8/2012 | Grigg et al. |
| 2012/0226545 A1 | 9/2012 | Gebb et al. |
| 2012/0226604 A1 | 9/2012 | Isaacson et al. |
| 2012/0233074 A1* | 9/2012 | Dangott ................ G06Q 40/02 705/44 |
| 2012/0239477 A1 | 9/2012 | Cueli |
| 2012/0245987 A1 | 9/2012 | Isaacson |
| 2012/0267432 A1 | 10/2012 | Kuttuva |
| 2012/0271689 A1 | 10/2012 | Etheredge et al. |
| 2012/0271691 A1 | 10/2012 | Hammand et al. |
| 2012/0271697 A1 | 10/2012 | Gilman et al. |
| 2012/0284187 A1 | 11/2012 | Hammad et al. |
| 2012/0290420 A1* | 11/2012 | Close ............................ 705/17 |
| 2012/0290950 A1 | 11/2012 | Rapaport |
| 2012/0303425 A1 | 11/2012 | Katzin et al. |
| 2012/0316945 A1 | 12/2012 | Wolf et al. |
| 2012/0323663 A1 | 12/2012 | Leach |
| 2012/0323765 A1 | 12/2012 | Spaulding et al. |
| 2013/0006848 A1 | 1/2013 | Kuttuva |
| 2013/0054336 A1 | 2/2013 | Graylin |
| 2013/0060679 A1 | 3/2013 | Oskolkov et al. |
| 2013/0066735 A1 | 3/2013 | Llach |
| 2013/0091000 A1 | 4/2013 | Ryan |
| 2013/0124278 A1 | 5/2013 | Najm |
| 2013/0124287 A1 | 5/2013 | Joseph |
| 2013/0132283 A1 | 5/2013 | Hayhow et al. |
| 2013/0151323 A1 | 6/2013 | David |
| 2013/0151401 A1 | 6/2013 | Scipioni et al. |
| 2013/0197991 A1 | 8/2013 | Gourab |
| 2013/0246150 A1 | 9/2013 | Joseph |
| 2013/0246273 A1 | 9/2013 | Joseph |
| 2013/0254004 A1 | 9/2013 | Karen |
| 2013/0254008 A1 | 9/2013 | Joseph |
| 2013/0268333 A1 | 10/2013 | Joseph |
| 2013/0282586 A1 | 10/2013 | Joseph |
| 2013/0325579 A1 | 12/2013 | Diane |
| 2013/0346191 A1 | 12/2013 | Morris et al. |
| 2014/0040051 A1 | 2/2014 | Ovick et al. |
| 2014/0040135 A1 | 2/2014 | Ovick et al. |
| 2014/0046744 A1 | 2/2014 | Hagey |
| 2014/0129308 A1 | 5/2014 | Rappoport |
| 2014/0129314 A1 | 5/2014 | Kim |
| 2014/0180826 A1 | 6/2014 | Boal |
| 2014/0214661 A1 | 7/2014 | Yankovich et al. |
| 2014/0229260 A1 | 8/2014 | Cervenka et al. |
| 2014/0229319 A1 | 8/2014 | Roberts et al. |
| 2014/0310080 A1 | 10/2014 | Salmon et al. |
| 2015/0019314 A1 | 1/2015 | Salmon et al. |
| 2015/0019435 A1 | 1/2015 | Ovick et al. |
| 2015/0106185 A1 | 4/2015 | Cervenka et al. |
| 2016/0358197 A1 | 12/2016 | Ovick et al. |
| 2017/0039560 A1 | 2/2017 | Ovick et al. |

FOREIGN PATENT DOCUMENTS

| | | |
|---|---|---|
| JP | 2004303015 | 10/2004 |
| KR | 20010083521 | 9/2001 |
| KR | 20010096673 | 11/2001 |
| KR | 1020020050219 | 6/2002 |
| KR | 20030080111 | 10/2003 |
| KR | 1020040016771 | 2/2004 |
| KR | 20040028110 | 4/2004 |
| KR | 1020040040253 | 5/2004 |
| KR | 1020040077077 | 9/2004 |
| KR | 1020050061661 | 6/2005 |
| KR | 20060101241 | 9/2006 |
| KR | 100717590 | 5/2007 |
| KR | 1020070110241 | 11/2007 |
| KR | 100836484 | 6/2008 |
| KR | 20080102439 | 11/2008 |
| MX | PA1013136 | 6/2004 |
| WO | 2000079461 | 12/2000 |
| WO | 2001039053 | 5/2001 |
| WO | 2000049551 | 5/2002 |
| WO | 2006121541 | 11/2006 |
| WO | 2008016923 | 2/2008 |
| WO | 2008102935 | 8/2008 |
| WO | 2009061019 | 5/2009 |
| WO | 2010093893 | 8/2010 |
| WO | 2010135642 | 11/2010 |
| WO | 2011028486 | 3/2011 |
| WO | 2013138756 | 9/2013 |
| ZA | 200200475 | 6/2003 |

OTHER PUBLICATIONS

International Patent Application PCT/US2010/035769, International Search Report and Written Opinion, dated Jan. 12, 2011.
International Patent Application PCT/US2010/037646, International Search Report and Written Opinion, dated Jan. 18, 2011.
International Patent Application PCT/US2010/046360, International Seach Report and Written Opinion, dated Mar. 30, 2011.
International Patent Application PCT/US2012/059607, International Search Report and Written Opinion, dated Mar. 15, 2013.
International Patent Application PCT/US2012/068541, International Search Report and Written Opinion, dated Mar. 20, 2013.
International Patent Application PCT/US2013/023642 International Search Report and Written Opinion, dated May 30, 2013.
International Patent Application PCT/US2013/032307 International Search Report and Written Opinion, dated Jun. 26, 2013.
International Patent Application PCT/US12/59607, International Preliminary Report on Patentability, dated Apr. 15, 2014.

(56) References Cited

OTHER PUBLICATIONS

International Patent Application PCT/US12/68541, International Preliminary Report on Patentability, dated Jun. 10, 2014.
International Patent Application PCT/US13/23642, International Preliminary Report on Patentability, dated Aug. 5, 2014.
ISO8583—A layman's guide to understanding the ISO8583 Financial Transaction Message, Mar. 11, 2008; retrieved from http://www.lytsing.org/downloads/iso8583.pdf.
Simon, Jeremy M., Credit card companies promote no-signature Transactions, Published on Oct. 17, 2006. Accessed on Apr. 15, 2016, from http://www.creditcards.com/credit-card-news/popular-credit-card-introduce-no-signature-cards-1273.php.

* cited by examiner

PAYMENT PROCESSING FOR QUALIFIED TRANSACTION ITEMS

CROSS REFERENCE TO RELATED APPLICATION

The present application claims priority to Prov. U.S. Pat. App. Ser. No. 61/660,341, filed Jun. 15, 2012 and entitled "Payment Processing for Qualified Transaction Items," the entire disclosure of which is hereby incorporated herein by reference.

BACKGROUND

Aspects of the disclosure relate to financial transactions conducted with portable consumer devices such as a payment card. In particular, one or more aspects of the disclosure relate to providing incentives for financial transactions that include a health benefit.

As the importance of healthy foods becomes increasingly realized, individuals and organizations in the public and private sectors have a desire to encourage people to purchase more healthy food items, such as fruits and vegetables. However, as healthy food items are often more expensive to purchase compared to "junk foods," it is difficult to incentivize individuals to purchase the healthy food items. It would also be costly, time-consuming, and inefficient for retail stores, grocery stores, and various vendor locations to process separate transactions after manually distinguishing the various categories under which the purchase items fall. As merchants are often concerned with convenience, ease of transacting business, and quickness of the transaction, it is difficult to implement a system that can incentivize healthy food purchases while providing convenience and efficiency in payment processing at the same time.

SUMMARY OF THE DESCRIPTION

Aspects of the present disclosure relate to systems, methods, and apparatuses for enabling efficient processing of financial transactions involving multiple categories of products and/or services. In some embodiments, a healthy food benefits system (hereinafter also referred to as couponing system) can provide incentives to consumers by offering consumers discounts toward healthy purchases. Individuals and organizations including private foundations and the Federal Government may provide funding towards a healthy food benefits account where consumers may receive a healthy food benefit (e.g., a discount) when purchasing transaction items (e.g., healthy foods) that fall under particular categories specified by the individuals and organizations. As such, the consumers have an incentive to purchase transaction items that fall under the particular categories.

In some embodiments, a couponing system can qualify purchase transaction items that are eligible for healthy food benefits. When purchase transaction items (e.g., healthy food items) are deemed eligible for healthy food benefits, a coupon (i.e., additional funds) may be applied to the purchase transaction. In some embodiments, the couponing system may determine that a purchase transaction item is eligible for healthy food benefits (e.g., healthy food subsidy dollars) by determining whether the purchase transaction item falls under a particular category specified by the individual or organization providing the healthy food benefits or funds.

Upon determining that the purchase transaction item is eligible, the couponing system allows the consumer to receive a discount (50% off) at the point of sale (POS) terminal. The consumer may then pay for the remaining balance using a benefits card (e.g., issued by the State) or using other funds from the consumer. In some embodiments, the couponing system may process the purchase transaction and the discount via a payment processing network (also referred to as a payment processor). The amount discounted from the purchaser's transaction can be drawn from the healthy food benefits account funded by the individual organization and credited to the merchant. Thus, the couponing system ensures efficiency, ease of transaction, and convenience for the merchant by processing the discounted funds at the POS terminal and drawing the discounted amount directly from a pre-paid or prefunded account (as opposed to having to save up the coupons and settling them with the manufacturer at a later time).

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Certain embodiments may provide a portable consumer device coupled with a benefit use to a recipient of the benefits. In some embodiments, the portable consumer device may be a card that is separate from a State benefit card. The portable consumer device may include an account number that would conform to or may be processed by one or more payment processing networks so that any point of sale (POS) terminal (e.g., at a grocery store) that accepts a payment card that can be processed by the payment processing network can recognize the account number and process the account number. The portable consumer device that includes the card number need not necessarily be plastic, but it can also be a piece of paper with a card number (account number) and/or a bar code on it that conforms to the payment processing system.

In some embodiments, in addition to the card number that conforms to the payment processing system (e.g., a sixteen digit account number), a bar code that resembles a coupon bar code (e.g., the bar codes that appear on a free-standing insert (FSI) which is a coupon booklet or advertising leaflet inserted in a magazine or newspaper that usually serves as a reply coupon or discount voucher) may be included on the portable consumer device.

In some embodiments, the bar code can convey information about transaction items that are eligible for special handling. In the course of constructing a bar code that is similar to a coupon code such as a coupon bar code, a hierarchy has already been established by the industry. The hierarchy takes manufacturer identification (MID) numbers into account. In some embodiments, the MID number (the highest level of a hierarchy) can represent a category of transaction items, such as produce grown in a particular state. As long as the consumer is purchasing the type of produce corresponding to the MID number, the foundation will fund the purchase.

Figure 1:
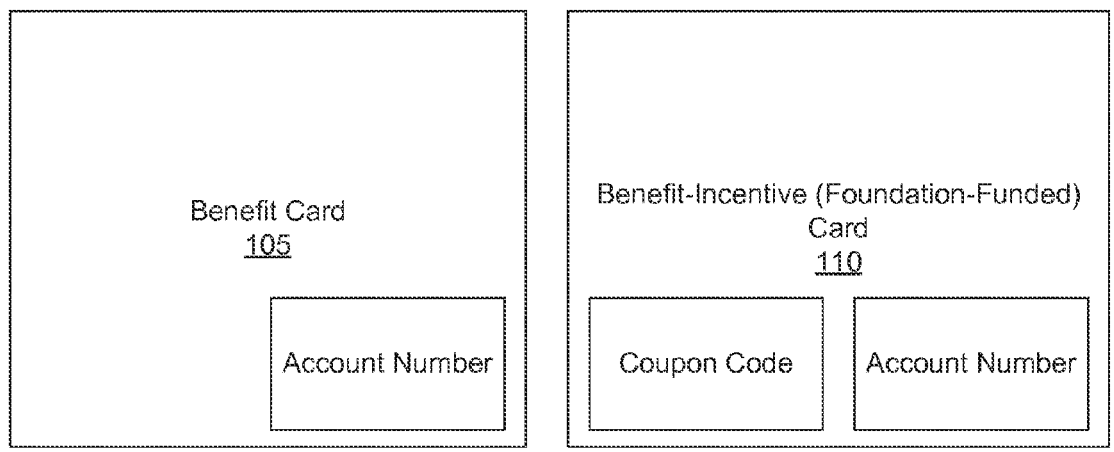
FIG. 1 illustrates an example of a benefit card (e.g., State benefit card) and a benefit-incentive card (also referred to as a foundation-funded card).

FIG. 1 illustrates an example of a benefit card 105 (e.g., State benefit card) and a benefit-incentive card 110 (also referred to as a foundation-funded card). In some embodiments, a benefit card can be one issued by a government (e.g., a particular state) for benefits, food stamps, etc. The benefit-incentive card can be issued by an entity (e.g., a private foundation, the Federal Government) who has partnered with a payment card issuer (e.g., a bank that issues payment cards). In some embodiments, the benefit-incentive card can be a plastic card or a piece of paper including an account number (e.g., sixteen-digit account number on a credit card) and a representation of a coupon.

In some embodiments, the physical plastic card may include a coupon image on the card that can be read by an embedded scanner at a grocery store. The card issuers may issue the benefit-incentive card including a picture of a coupon or coupon bar code and a 16-digit account number that is pre-funded or that is funded with an open-to-buy so that a portion of the total bill for healthy food items will be paid by the benefit-incentive card (presented by the consumer).

In some embodiments, representation of a MID number or a coupon bar code can reside on the benefit-incentive card. At the point of sale, the POS terminal can read the bar code off of the card and start looking for transaction items that fall under the category identified by the bar code. For instance, the bar code may identify a category that includes produce from a particular state. As such, once the POS terminal receives the bar code (e.g., by scanning the portable consumer device including the bar code or coupon code, at the beginning of the check-out process), the POS terminal starts to identify the transaction items that fall under the category of produce from a particular state.

Figure 2:
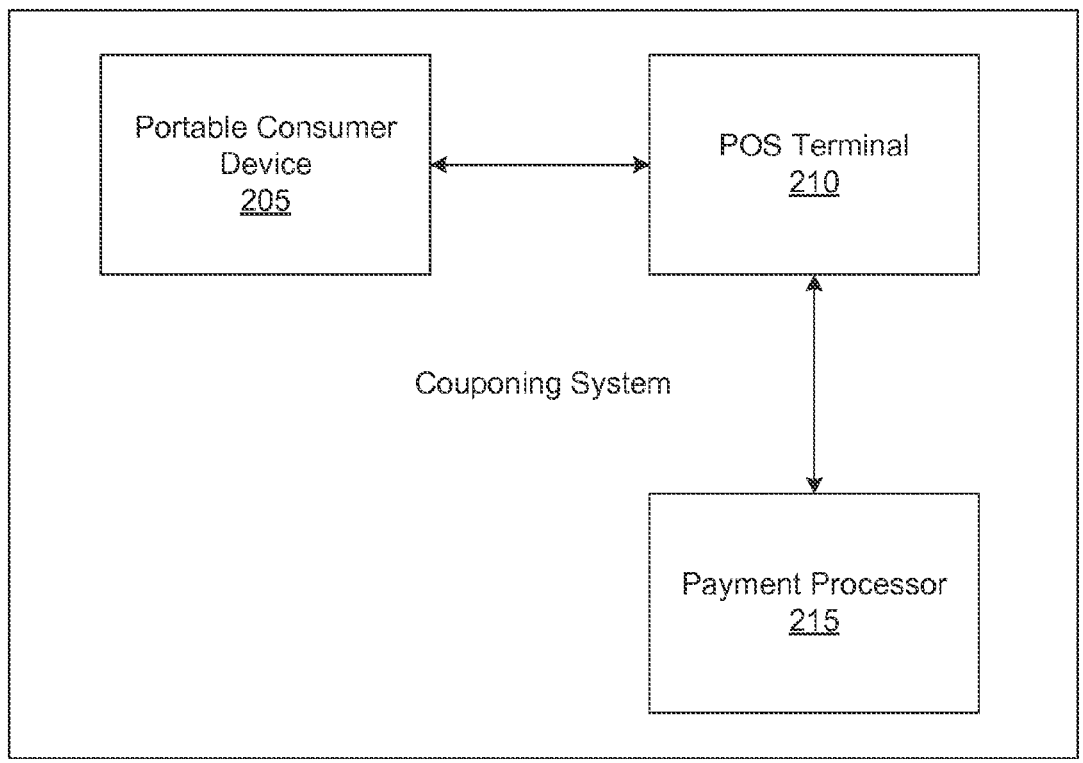
FIG. 2 illustrates an example operating environment in which one or more illustrative aspects of the disclosure may be implemented.

FIG. 2 illustrates an example operating environment in which one or more illustrative aspects of the disclosure may be implemented. As seen in FIG. 2, a portable consumer device (e.g., a benefit-incentive card) 205 may electronically communicate via a POS terminal 210 with a payment processor 215. When a purchase transaction is being processed using the portable consumer device, the payment processor may determine whether funds are available in one or more pre-funded accounts.

At the POS, the merchant may deduct a dollar amount from the total cost of items eligible for the coupon code (i.e., items with a product lookup unit (PLU) or stock keeping unit (SKU) that matches or falls under the MID number). Instead of receiving a physical paper coupon, scanning, placing the coupon into the drawer and then redeeming the dollar amount from a manufacturer, the dollar amount that is deemed as eligible for healthy food benefits (or any other category pre-specified by a private foundation, by the Government) may be processed and authorized by going through a payment processing system where prepaid funds are already residing in a prepaid account dedicated for the healthy food benefits. As such, the reimbursement process is happening live and the merchant is not handling it in a back room.

In some embodiments, a POS terminal at cooperating merchants (e.g., grocery stores) may coordinate with a payment processer to create a schema of items eligible under a particular coupon code. The payment processor may support the launch of a private label card including the coupon code for a particular category of goods and/or services (e.g., fresh fruits and vegetables).

In some embodiments, the POS terminal identifies the transaction items that fall under the category by determining whether a product lookup unit (PLU) associated with each transaction item falls under the particular category. The determination may be performed by employing a matching process. In some embodiments, the particular category may include a set of codes that can each correspond to a particular item (e.g., an apple, a cabbage). Some embodiments may compare the set of codes with the PLU code or SKU code of the transaction item to identify the transaction items that fall under the particular category. Upon identifying a match, the POS terminal can flag and keep track the matching transaction item(s).

After identifying the matching transaction items, some embodiments can tally the subtotal cost of the transaction items. In some embodiments, a split transaction may be employed. The transaction may go out to the payment processor to obtain approval. Some embodiments may send the transaction to the card issuer and/or the payment processor. If there is an available balance and that the transaction is in compliance with business rules that may be in effect and that are managed by the foundation (e.g., a maximum amount per day, the stores to which the transaction is limited). In some embodiments, the funds for the foundation reside at a bank and the transaction is processed by drawing upon this account. The funds in this account may be pre-paid by an organization in some embodiments.

In a separate transaction, the rest of the groceries or transaction items can be purchased using the benefits card (e.g., a State benefits card). These transaction items may be processed in a way similar to the way benefit cards are typically processed, such as through electronic benefits transfer (EBT) card processing.

Figure 3:
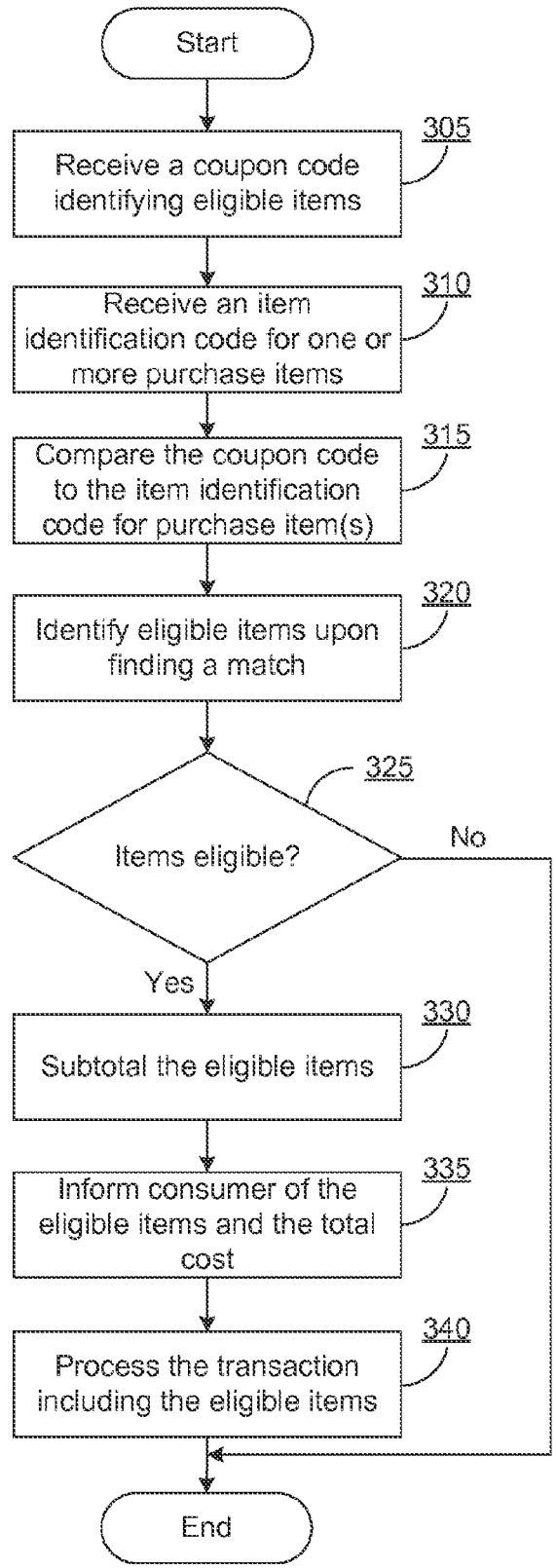
FIG. 3 illustrates an example process for processing a purchase transaction eligible for healthy food benefits in accordance with some embodiments.

FIG. 3 illustrates an example process for processing a purchase transaction eligible for healthy food benefits in accordance with some embodiments. As entities such as private foundations and the Federal Government are willing to provide funds to incentivize individuals (e.g., recipients of public food assistance dollars) to purchase fruits and vegetables, an automated way to qualify purchases is necessary such that items identified to be eligible may be paid using funds provided by those entities. In some embodiments, a couponing system may track whether fruits and vegetables are eligible when a benefit recipient takes his or her items to checkout.

Some embodiments provide a coupon-based portable consumer device that can be used for specific goods. In some embodiments, the coupon can be loaded onto the portable consumer device. In some embodiments, the funds for the coupon (i.e., funds that would be paid to the merchant when the consumer uses the coupon at POS) may be prepaid (e.g., by a private foundation with privately funded money). Upon qualifying the goods and identifying the ones that fall under a specific category, the POS gives the consumer a redemption at the POS terminal.

At block 305, process receives a set of coupon codes from a portable consumer device at check-out (e.g., the POS register) where the set of coupon codes may identify the eligible items. In some embodiments, a coupon code or coupon manufacturing code can qualify or identify items (e.g., a state's domestically grown produce) in a shopping basket prior to the purchase transaction. Individuals or organizations may create a coupon code (e.g., a three-digit code) for a program such a healthy food promotion program. The couponing system may link the coupon code to a MID number that may be associated with a set of SKU numbers or PLU numbers. The couponing system may determine whether the transaction item is eligible based upon the coupon hierarchy and process, which makes it easier from a retailing standpoint.

The couponing system in some embodiments may define a new coupon code that can correspond to a particular category of goods and/or services. That is, a new identification for a particular category of produce may be created and associated with a set of PLU numbers and/or SKU numbers representing a set of transaction items. In some embodiments, an organization creating the new identification number and identifying the PLUs of the transaction items that correspond to the new identification numbers can distribute the new identification numbers to various POS terminals e.g., in an Excel spreadsheet or data file, such that the various POS terminals may be able to identify which products or transaction items fall under each coupon code. The Excel spreadsheet or data file may specify the identification number or coupon code and the corresponding PLUs that fall within the category.

At block 310, process receives an item identification code (e.g., a SKU number, a PLU number) for one or more transaction items (also referred to as purchase items) at the POS register. In some embodiments, the system at the grocery store may have in their T-log files a list of eligible items or identification, such that the POS register knows which items are eligible for a special thing (e.g., the healthy benefit) when the items are being rung up at the register.

At block 315, process compares the set of coupon codes to the item identification code for one or more transaction items. At block 320, process identifies the eligible items upon finding a match. At block 325, a determination as to whether one or more of the transaction items are identified to be eligible is made. When one or more of the transaction items are identified to be eligible, at block 330, the amount of all eligible items is subtotaled. When the transaction items are identified to not be eligible, the process ends.

At block 335, process informs the consumer of the eligible items and the total cost. At block 340, process processes the transaction items identified to be eligible using the received coupon code.

In one example, the consumer may have a benefit card from a government (e.g., a particular state) and a foundation-funded card (also referred to as coupon card) which includes a representation of a coupon or coupon code and a sixteen digit identification number. The coupon code may represent a category that includes produce manufactured in a particular state. Upon scanning the coupon code, the POS register would identify and keep track of how many and which transaction items in the shopping basket are produce from the particular state as the transaction items are being check-out. At the end of the check-out, the POS system may tally the number of items (e.g., fruits and vegetables) that were grown in the particular state and determine the total cost. At the POS terminal, the user may pay for a portion (e.g., 50%) of the total cost of the produce from a particular region (e.g., a particular state in a country) that was tallied using the foundation-funded card and then pay for the remaining balance using the benefit card issued by a government (e.g., a particular state).

Figure 4:
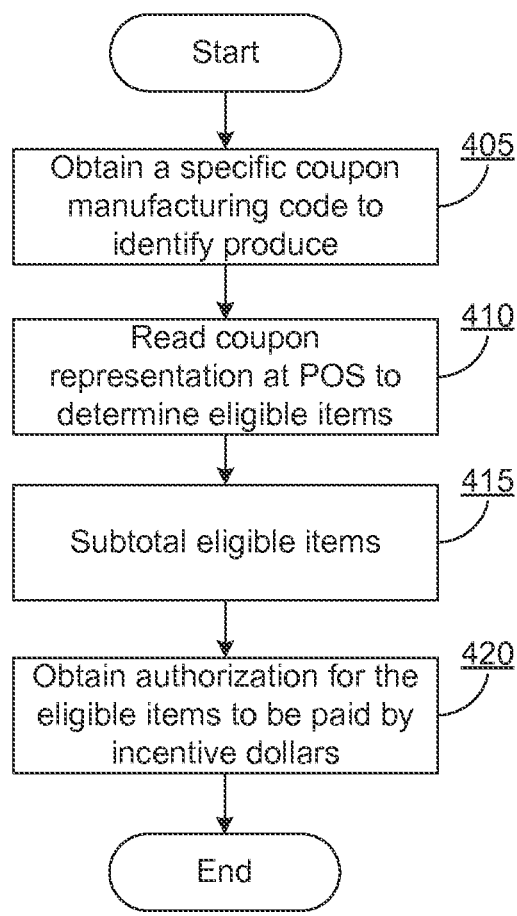
FIG. 4 illustrates an example process for determining eligibility for healthy food benefit in accordance with some embodiments.

FIG. 4 illustrates an example process for determining eligibility for healthy food benefit in accordance with some embodiments. At block 405, a couponing system may obtain a specific coupon manufacturing code to identify produce or a subset of produce (i.e., a state's domestically grown produce). A coupon representation/bar code with the "manufacturer/state" code can be put on a benefit card. At block 410, and coupon representation/bar code can then read by a POS to determine eligible items for healthy food subsidy dollars.

At block 415, by reading the coupon manufacturing code, the shopping basket can be subtotaled by eligible items. At block 420, an approval can be sought for the amount of the shopping basket's produce items to be paid by incentive dollars, which may come from any source, such as a corporation, a government (Federal or state), a private foundation, etc. The healthy food incentive card is swiped and an authorization obtained by routing the transaction through the merchant's existing merchant bank for payment processing as they would for any other payment card associated with a payment processor.

In some embodiments, the amount of the shopping basket items eligible for incentive dollars can be assessed based on the swipe of a state benefit card and sent to the issuer/issuer-processor for approval by using additional amount fields similar to the process used in health savings account (HAS) card purchases, as further described below.

Figure 5:
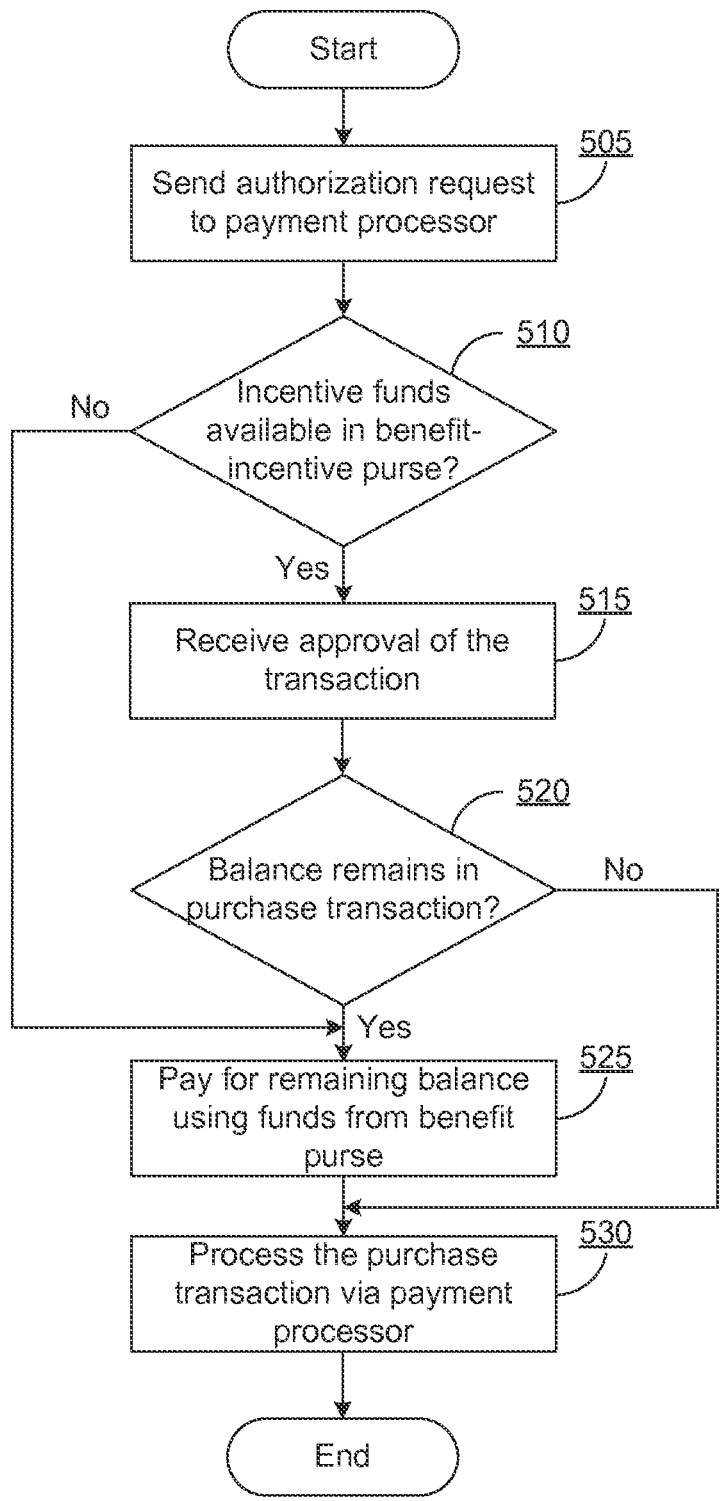
FIG. 5 illustrates an example process of processing the transaction including items identified to be eligible for the healthy food benefit in accordance with some embodiments.

FIG. 5 illustrates an example process of processing the transaction including items identified to be eligible for the healthy food benefit in accordance with some embodiments. At block 505, an authorization request may be sent to the payment processor. In some instances, the benefit incentive card is used (e.g., swiped at the POS terminal similar to how a credit card is used) and an authorization request is sent to the payment processor.

At block 510, a determination is made as to whether incentive funds are available for these items. At block 515, the payment processor or the issuer approves the transaction if incentive funds are available for these items. The clearing and the settlement process may follow the standard purchase processing via the payment processor. If incentive funds are not available for these items, at block 525, the balance may be paid for using funds from a benefit purse (or out-of-pocket).

At block 520, a determination is made as to whether there is a remaining balance in the purchase transaction. In some instances, the state benefit card can be used and a message formatted with a total purchase amount, along with a field including the qualified amount for incentive dollars may be specified in an authorization request. At block 525, the authorization request is sent to the payment processor and the issuer/issuer processor approves the transaction taking incentive funds from an incentive purse if available, and the rest of the value from the state benefit purse.

At block 530, the issuer may then respond to the authorization request and if approved, the transaction follows the typical payment processing clearing and settlement process. If there is no remaining balance in the purchase transaction after receiving approval from retrieving incentive funds, at block 530, the purchase transaction may be processed by taking funds from the incentive purse.

Once data is collected and separated, some embodiments obtain authorization for the purchase transaction through the payment processing system. In some embodiments, the processing of the funding may be performed via the payment processor. The data related to the purchase transaction (e.g., the number of fruits and vegetable that are in the purchase transaction and the dollar amount) may be included in the authorization message. As such, the system can collect data as to what people have purchased bar code scanners key logs and interrogation abilities.

Figure 6:
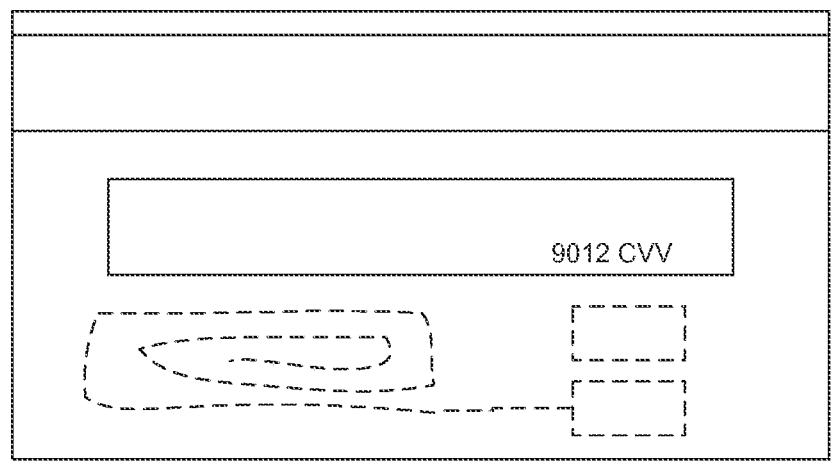
FIG. 6 illustrates an example of a single card that can perform the same function in accordance with some embodiments.

FIG. 6 illustrates an example of a single card (instead of two separate cards) that can perform the same function in some embodiments. In some embodiments, an organization that is providing these incentive funds (e.g., private incentive funds that are separate from the purse of the benefits card (e.g., EBT card, food stamp card)) can partner (e.g., be in a contract) or work together with a same issuer party (e.g., a particular state in a country) who issues the EBT card to a vendor. In such embodiments, the consumer may not need to have two slides or two transactions to obtain settlement of the transaction.

In some embodiments, the issuer processor partner who maintains the two purses on the issuing side of the business may have a purse that is associated with the food stamps (e.g., the general fund of food stamps for that beneficiary) and a separate purse that would be funded by the incentive program or the private funds at the point of sale. The transaction may be processed in a similar manner except that the couponing system would be aware that this is a benefits card (e.g., issued by a particular state in a country) and so it knows that every recipient or beneficiary is entitled to these extra-special funds and so it will go through the shopping basket and, based on the particular state in the country issuing VIN (every state and territory has a unique VIN or VIN range for their state programs), it will identify anything that is a PLU produce (e.g., produce grown in the particular state in the country), subtotal the items, and allow the consumer to choose, at the time of payment, whether the consumer wants to bank those points and keep them for later or whether they want to use their purse of incentive funds at that time.

In the embodiment where there is only one card with multiple purses, one may not need a MID number, but can just use the issuing state VIN. As such, when the POS terminal sees the issuing state VIN and determines that these produce are produce grown in the particular state in a country (e.g., via the PLUs associated with the produce), the couponing system may subtotal the amount and provide the consumer a choice. For instance, the POS terminal may inquire the consumer whether the consumer would want to take 50% of this value of the produce total of the incentive dollars or would the consumer want to save the credit and do a value transaction later on. While in some embodiments, the POS terminal may provide the customer a choice, some embodiments may automatically draw the funds from the incentive dollar purse.

The consumer may be presented with the choice as to whether the consumer would want to split the transaction into two and withdraw from two separate purses (e.g., the benefit-incentive fund and the state benefit fund/food stamp fund). In some embodiments, the consumer may be presented with the choice as to redeeming the benefit-incentive fund that is eligible to be applied towards 50% of the current purchase or save the credit and do a value transaction later with the accumulated credit. In some embodiments, the consumer may not be presented with a choice, but the couponing system automatically withdraws the eligible amount for the healthy food benefit from the benefit-incentive fund and applies the rest of the purchase amount towards either the state benefit fund and/or the account number that is associated with the user's own account. The funds may be drawn entirely from one issuer, or split up between the issuer and the state, or split at the issuer.

While in some embodiments, the transaction may be split at the POS terminal, the purchase transaction may be passed through as a single transaction where the processing can be worked out at the issuer. In the message to be sent to the payment processor, there can be multiple places where an amount field can be inserted. In some embodiments, there can be multiple amounts identified by the processing message in different fields of the message to convey different amounts for different categories.

In some embodiments, the consumer can decide at the POS whether the consumer desires to use multiple purses to perform the purchase. At the POS, there may be an initial transaction where the consumer would make the decision upon seeing the subtotal displayed to the consumer at the POS terminal. In one example, the register may inform the consumer that the consumer has purchased $10 worth of produce from the particular state in the country and inquire whether the consumer would want $5 of that to come from the benefit incentive account. The consumer may make a decision at the POS register. If the consumer decides to use the incentive account, then the issuer/processor would be informed when they receive the transaction. The issuer/process may then debit $5 from the incentive purse and the rest of the transaction from the regular EDT purse.

If the consumer decides not to use the incentive account (i.e., decides not to redeem the incentive dollars right away), the couponing system in some embodiments allow the consumer to bank the points. When the consumer banks the points, the consumer can get credit for buying the fresh produce and bank the benefit. For example, when a season for harvesting a fruit comes along, the consumer will be able to buy a bunch of the fruit and can them. In some instances, the consumer may decide to use the saved funds that the consumer has been banking for the produce from the particular state or the amount that is on the state benefits card (e.g., bridge card for the particular state).

In some embodiments, the couponing system can enable the consumer to bank the points by having a designation in the processing message. In some embodiments, this may be performed by having two different messages that can indicate that the consumer is redeeming the whole sales ticket against the EBT purse and crediting $5 to the incentive purse. In some embodiments, such as in healthcare auto-substantiation, the processing message can include multiple amount fields that can be used to convey the different scenarios. The processing message can include a total amount of what the eligible items are in one of the multiple amount fields and send the information to the issuer/processor. When the processing message gets to the issuer/processor, the issuer/processor would know whether to apply the amount or to bank the amount.

Further, the couponing system in some embodiments allows the user to submit inquiries regarding the various accounts associated with the portable consumer device. In some embodiments, after the system tallies the subtotal of the purchase, the system may provide information to the consumer or cardholder at the POS terminal upon receiving a POS balance inquiry. The information may include a balance in each of the purses (i.e., how many dollars the consumer has in each purse). With the information presented to the customer, the consumer can make the decision as to which purses to use and what amount from each purse. From a benefits card (e.g., EDT card) perspective, there may be a processing requirement where the cardholder can do a balance inquiry on the particular account. In some embodiments, the payment processer may determine the balance of each purse and provide information to the consumer such that the consumer can have sufficient information in deciding whether to do a "split tender" between the various balances the consumer has the purses. Further, in some embodiments, the system may support balance inquiry regardless of whether a transaction is taking place.

The couponing system provides a benefit card that enables people to receive additional incremental foundation-funded or private section-funded incentives for purchasing healthy and fresh produce. As such, food stamp recipients may be incentivized to adopt healthier eating choices, including going to farmers' markets to redeem benefits that the government pays for and purchasing fresh fruit or produce in the grocery segment. Systems and methods capable of identifying and categorizing transaction items at the POS terminal can accumulate transactions (e.g., at least five purchases of vegetables) and apply benefit dollars (e.g., provided by the Federal government, from a private foundation) to the accumulated transactions.

The couponing system may help facilitate the accumulation and spending of incentive dollars for healthy eating purchases at retail stores, grocery stores, and farmers market vendor locations. Instead of a conventional physical paper coupon offered by a manufacturer, this couponing system is directed to encourage beneficiaries in the benefit space where the usage may encourage a public benefit.

This couponing system may also support redemption of foundation dollars at one or more participating merchants (e.g., grocery stores, farmer's market vendors). A beneficiary may be incentivized to purchase more fruits and vegetables by using this benefit card. Further, in some embodiments, an organization or a private foundation may team up with a payment processer to create private label products. Product information including product view or photos may be presented to a consumer (e.g., through a user-defined field) through the platform in addition to the existing standard of what a purchase message includes.

In some embodiments, a payment processing network can be used in multiple ways. For example, a payment processor can support the launch of a private label card displaying the coupon code for the fresh fruits and vegetables. The payment processor can work with the grocery acceptance locations to create a schema of items eligible under the coupon code. In another example, the benefit recipient can take the items to checkout. While checking out, the grocers system will track whether fruits and vegetables are eligible. If the items are eligible, the amount of all eligible items is subtotaled.

In one instance, the benefit incentive card can then be swiped, causing an authorization request to be sent to the payment processor. The payment processor/issuer can approve the transaction if incentive funds are available. The clearing and settlement process then follows the standard process when purchasing items via a payment card associated with the payment processing network.

In another instance, the state benefit card can be swiped and the message can be formatted with a total purchase amount. An additional field with the qualified amount for incentive dollars can be specified in the authorization request. The authorization request can then be sent to the payment processor and the issuer/issuer processor can then approve the transaction. The issuer/issuer processor may take the incentive funds from an incentive purse if available and the rest of the value from the state benefit purse. The issuer can respond to the authorization request and if approved, the transaction then follows a similar clearing and settlement process.

Having described several example methods of processing one or more transactions using a couponing system, as well as other functionalities that may be provided by a couponing system, an example computing device that may be embody various aspects of the disclosure will now be described with respect to FIG. 7.

Figure 7:
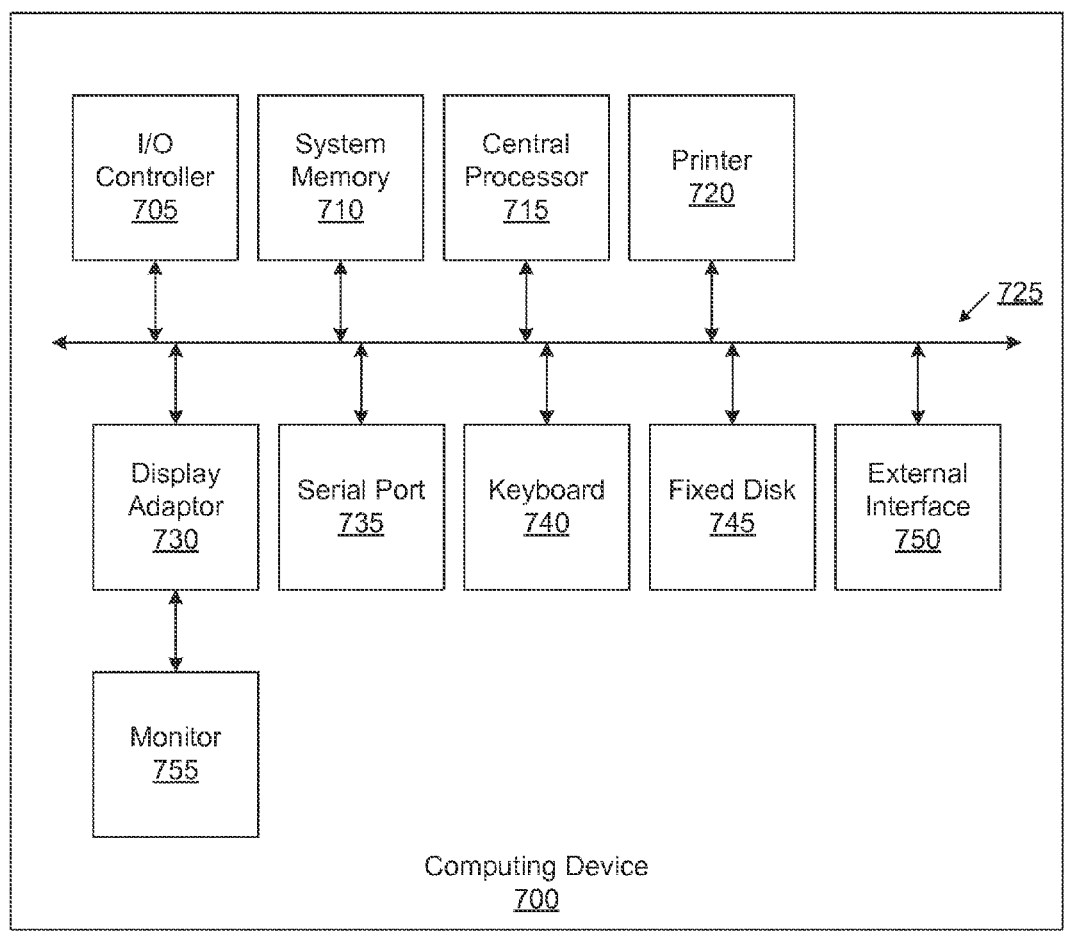
FIG. 7 illustrates an example of a computer apparatus in which various aspects of the disclosure may be implemented.

FIG. 7 illustrates an example of a computer apparatus in which various aspects of the disclosure may be implemented. The various participants and elements in the previously described system diagrams may use any suitable number of subsystems in the computing device to facilitate the functions described herein. Examples of such subsystems or components are shown in FIG. 7. The subsystems shown in FIG. 7 are interconnected via a system bus 725. Additional subsystems such as a printer 720, keyboard 740, fixed disk 745 (or other memory comprising computer-readable media), monitor 755, which is coupled to display adapter 730, and others are shown. Peripherals and input/output (I/O) devices (not shown), which couple to I/O controller 705, can be connected to the computer system by any number of means known in the art, such as serial port 735. For example, serial port 735 or external interface 750 can be used to connect the computer apparatus to a wide area network such as the Internet, a mouse input device, or a scanner. The interconnection via system bus 725 allows the central processor 715 to communicate with each subsystem and to control the execution of instructions from system memory 710 or the fixed disk 745, as well as the exchange of information between subsystems. The system memory 710 and/or the fixed disk 745 may embody a computer-readable medium.

It should be understood that certain elements of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Various embodiments provide a number of technical advantages. By providing a system that can process coupon codes on a portable consumer device to identify purchases that are eligible for incentive funds from an pre-funded incentive account, embodiments of the invention can encourage the purchase of certain items and facilitate the processing of those purchase transactions. Some embodiments can allow merchants to obtain the discounted amount directly from a bank account that is prefunded at the time of processing the purchase transaction at the POS terminal. Embodiments of the invention can also advantageously be applied to many different types of systems including Hadoop and SAS systems.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

Any recitation of "a", "an" or "the" is intended to mean "one or more" unless specifically indicated to the contrary.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A point of sale (POS) terminal, comprising:
a bar code scanner configured to read a bar code from a portable consumer device, wherein the portable consumer device comprises an electronic coupon loaded to enable payment in a transaction, the coupon associated with an account number identifying a funding source of a benefit in a payment processing network, the coupon comprising a first code representing a first category of eligible items of different types, the first category of eligible items eligible for the benefit sponsored by the funding source, and the payment processing network comprising a payment processor computing device;
a processor;
memory storing instructions configured to instruct the processor to:
receive, for storage at the POS terminal, a plurality of coupon codes, each coupon code corresponding to a respective category of eligible items, and each category associated with a set of item identification codes;
receive, by the POS terminal from the portable consumer device, during a check-out process of a user purchasing a set of purchase items of different types, the first code, wherein the receiving the first code comprises reading the bar code from the portable consumer device using the bar code scanner;
receive, by the POS terminal, the account number, wherein the account number is read from the portable consumer device;
identify, by the POS terminal, a subset of the purchase items, wherein the identifying the subset is based on the received first code, the stored plurality of coupon codes, and a schema of eligible items classified under the first category, and wherein the identifying the subset further comprises determining whether a first purchase item in the set of purchase items is in the first category based on whether a first item identification code of the first purchase item is classified under the first category in accordance with the schema; and
generate, by the POS terminal, a split transaction in which an authorization request for the benefit applied to the subset of the purchase items is processed in accordance with the account number in the payment processing network;
wherein, in the split transaction, the POS terminal is configured to accept the benefit applied to the subset of the purchase items as a first payment for the set of purchase items and configured to accept a second payment for the set of purchase items;
wherein electronic authorization communication by the POS terminal regarding the split transaction causes the payment processor computing device to charge the first payment to a first account identified by the account number, and to charge the second payment to a second account of a source other than the funding source.

2. The point of sale (POS) terminal of claim 1, wherein the bar code has a hierarchy taking into account manufacturer identification numbers.

3. The point of sale (POS) terminal of claim 1, wherein the first item identification code includes one of: a product lookup unit (PLU), or a stock keeping unit (SKU).

4. The point of sale (POS) terminal of claim 1, wherein funds in an account identified by the account number in the payment processing network are pre-paid.

5. The point of sale (POS) terminal of claim 1, wherein the first code further identifies a manufacturer identification number, and the schema further determines whether or not a purchase item is eligible for the benefit based at least in part on whether the purchase item is associated with the manufacturer identification number.

6. The point of sale (POS) terminal of claim 1, wherein the portable consumer device is a plastic card including a coupon image.

7. A computer-implemented method performed at a point of sale (POS) terminal, the method comprising:
receiving, for storage at the POS terminal, a plurality of coupon codes, each coupon code corresponding to a respective category of eligible items, and each category associated with a set of item identification codes;
receiving, by the POS terminal from a portable consumer device, during a check-out process of a user purchasing a set of purchase items of different types, a first code representing a first category of eligible items of different types, the first category of eligible items eligible for a benefit sponsored by a funding source, wherein the receiving the first code comprises reading a bar code from the portable consumer device using a bar code scanner, and wherein the portable consumer device comprises an electronic coupon loaded to enable payment in a transaction, the coupon associated with an account number identifying a funding source of a benefit in a payment processing network, the coupon comprising the first code, and the payment processing network comprising a payment processor computing device;

receiving, by the POS terminal, the account number, wherein the account number is read from the portable consumer device;

identifying, by the POS terminal, a subset of the purchase items, wherein the identifying the subset is based on the received first code, the stored plurality of coupon codes, and a schema of eligible items under the first category, and wherein the identifying the subset further comprises determining whether a first purchase item in the set of purchase items is in the first category based on whether a first item identification code of the first purchase item is classified under the first category in accordance with the schema; and generating, by the POS terminal, a split transaction in which an authorization request for the benefit applied to the subset of the purchase items is processed in accordance with the account number in the payment processing network;

wherein, in the split transaction, the POS terminal is configured to accept the benefit applied to the subset of the purchase items as a first payment for the set of purchase items and configured to accept a second payment for the set of purchase items;

wherein electronic authorization communication by the POS terminal regarding the split transaction causes the payment processor computing device to charge the first payment to a first account identified by the account number, and to charge the second payment to a second account of a source other than the funding source.

8. The method of claim 7, wherein the first category of eligible items includes different types of healthy foods.

9. The method of claim 7, wherein the first payment is charged to an account identified by the account number via the payment processing network.

10. The method of claim 9, wherein the bar code has a hierarchy taking into account manufacturer identification numbers.

11. The method of claim 7, wherein the first item identification code includes one of: a product lookup unit (PLU), or a stock keeping unit (SKU).

12. The method of claim 7, wherein funds in an account identified by the account number in the payment processing network are pre-paid.

13. The method of claim 7, wherein the first code further identifies a manufacturer identification number, and the schema further determines whether or not a purchase item is eligible for the benefit based at least in part on whether the purchase item is associated with the manufacturer identification number.

14. A non-transitory computer readable medium storing instructions configured to instruct a point of sale (POS) terminal to:

receive, for storage at the POS terminal, a plurality of coupon codes, each coupon code corresponding to a respective category of eligible items, and each category associated with a set of item identification codes;

receive, by the POS terminal from a portable consumer device, during a check-out process of a user purchasing a set of purchase items, a first code representing a first category of eligible items, the first category of eligible items eligible for a benefit sponsored by a funding source, wherein the receiving the first code comprises reading a code from the portable consumer device using a scanner, and wherein the portable consumer device comprises an electronic coupon loaded to enable payment in a transaction, the coupon associated with an account number identifying a funding source of a benefit in a payment processing network, the coupon comprising the first code, and the payment processing network comprising a payment processor computing device;

receive, by the POS terminal, the account number, wherein the account number is read from the portable consumer device;

identify, by the POS terminal, a subset of the purchase items, wherein the identifying the subset is based on the received first code, and wherein the identifying the subset further comprises determining whether a first purchase item in the set of purchase items is in the first category based on whether an item identification code of the first purchase item is classified under the first category; and generate, by the POS terminal, a split transaction in which an authorization request for the benefit applied to the subset of the purchase items is processed in accordance with the account number in the payment processing network;

wherein, in the split transaction, the POS terminal is configured to accept the benefit applied to the subset of the purchase items as a first payment for the set of purchase items and configured to accept a second payment for the set of purchase items;

wherein electronic authorization communication by the POS terminal regarding the split transaction causes the payment processor computing device to charge the first payment to a first account identified by the account number, and to charge the second payment to a second account of a source other than the funding source.

* * * * *